(12) United States Patent
Shibata et al.

(10) Patent No.: US 6,606,119 B1
(45) Date of Patent: Aug. 12, 2003

(54) SEMICONDUCTOR ARITHMETIC CIRCUIT

(76) Inventors: Tadashi Shibata, 3-16-411, Echujima 1-chome, Koto-ku, Tokyo (JP), 135-0044; Tadahiro Ohmi, 1-17-301, Komegabukuro 2-chome, Aoba-ku, Sendai-shi, Miyagi-ken (JP), 980-0813

( * ) Notice: Subject to any disclaimer, the term of this patent is extended or adjusted under 35 U.S.C. 154(b) by 0 days.

(21) Appl. No.: 09/039,126

(22) Filed: Mar. 13, 1998

(30) Foreign Application Priority Data

Mar. 15, 1997  (JP) .............................................. 9-081876

(51) Int. Cl.$^7$ .......................... H04N 5/208; H04N 9/64; H04N 5/217; H04N 5/21
(52) U.S. Cl. ...................... 348/252; 348/241; 348/625; 348/253
(58) Field of Search ................................ 348/241, 252, 348/253, 625, 630

(56) References Cited

U.S. PATENT DOCUMENTS

| | | | | |
|---|---|---|---|---|
| 5,757,977 A | * | 5/1998 | Mancuso et al. ............ | 382/260 |
| 5,864,495 A | * | 1/1999 | Sakashita et al. ........... | 364/807 |
| 5,917,742 A | * | 6/1999 | Ohmi et al. ................. | 364/807 |
| 5,926,214 A | * | 7/1999 | Denyer et al. .............. | 348/241 |
| 5,939,925 A | * | 8/1999 | Shibata et al. .............. | 327/355 |
| 5,956,434 A | * | 9/1999 | Shibata et al. .............. | 382/278 |
| 6,081,825 A | * | 6/2000 | Kohchi et al. .............. | 708/801 |

FOREIGN PATENT DOCUMENTS

| | | |
|---|---|---|
| JP | 60-68654 A | 4/1985 |
| JP | 3-6679 A | 1/1991 |
| JP | 5-335506 A | 12/1993 |
| JP | 5-335656 A | 12/1993 |
| JP | 6-53431 A | 2/1994 |
| JP | 6-77427 A | 3/1994 |
| JP | 6-112427 A | 4/1994 |
| JP | 6-139380 A | 5/1994 |
| JP | 6-244375 A | 9/1994 |
| JP | 6-250994 A | 9/1994 |
| JP | 6-252744 A | 9/1994 |
| JP | 07153924 A | 6/1995 |
| JP | 07161942 A | 6/1995 |
| JP | 07200513 A | 8/1995 |
| JP | 07211084 A | 8/1995 |
| JP | 07226085 A | 8/1995 |
| JP | 07226912 A | 8/1995 |
| JP | 08084062 A | 3/1996 |
| JP | 08195091 A | 7/1996 |
| JP | 08221504 A | 8/1996 |
| JP | 08274197 A | 10/1996 |
| JP | 09244875 A | 9/1997 |
| JP | 09245110 A | 9/1997 |
| WO | WO 90/13912 | 11/1990 |
| WO | WO 92/16971 | 10/1992 |
| WO | WO 93/24958 | 12/1993 |
| WO | WO 95/20268 | 7/1995 |
| WO | WO 95/22145 | 8/1995 |
| WO | WO 96/30853 | 10/1996 |
| WO | WO 96/30854 | 10/1996 |
| WO | WO 96/30855 | 10/1996 |
| WO | WO 96/30948 | 10/1996 |

* cited by examiner

*Primary Examiner*—Wendy R. Garber
*Assistant Examiner*—Lin Ye
(74) *Attorney, Agent, or Firm*—Randall J. Knoth

(57) ABSTRACT

The present invention has as an object thereof to provide a semiconductor arithmetic circuit which is capable of conducting edge accentuation processing, edge detection processing, and noise removal by means of averaging processing of an image, using extremely simple circuitry. A semiconductor arithmetic circuit is provided with an amplifier circuit in which an input terminal is connected to the gate electrode of at least one MOS type transistor, a first signal input terminal, which is connected with the input terminal via a first switching element, and a plurality of second signal input terminals, which are connected with the input terminal via a capacity element; wherein a mechanism is provided for opening the first switching element in a state in which a first signal voltage is applied to the input terminal and a predetermined second input signal voltage group is applied to the second signal input terminals, and for thereafter applying a predetermined third input signal voltage group to the second signal input terminals, and wherein the amplifier circuit comprises a source follower circuit or a voltage follower circuit.

20 Claims, 4 Drawing Sheets

SEMICONDUCTOR ARITHMETIC CIRCUIT

BACKGROUND OF THE INVENTION AND DESCRIPTION OF RELATED ART

1. Field of the Invention

The present invention relates to a semiconductor arithmetic circuit, and in particular, relates to a highly functional arithmetic circuit which is employed in image processing and the like.

2. Background Technology

In concert with the development in multimedia technology, the need for operations which handle image data has increased. Image data are expressed as picture element data which are fundamentally arrayed in two directions, so that the amount of such data is extremely large, and when operations were conducted one by one using conventional microprocessors, this required a great deal of time. In particular, this presented large problems in image processing operations which required real time responses, such as robotic applications, and a technological breakthrough was required.

Methods for solving these difficulties were widely proposed in which identical arithmetic circuits were provided for each picture element, and operations were conducted in which the data of the surrounding picture elements was incorporated into the position of each picture element. Since operations at each picture element were conducted in parallel, high speed processing was possible. However, in this method, the scale of the arithmetic circuitry required to conduct such advanced operations was large, and the surface area occupied by one picture element was large, so that there was a problem in that the integration density of the picture elements could not be increased. That is to say, the problem was that it was impossible to increase the resolution of the image. In particular, extremely complex circuitry was required in order to conduct operations such as the reduction of noise by averaging or edge accentuation in order to increase the visibility of the image, so that it was difficult to achieve both an increase in picture element density and an increase in the resolution of the incorporated image.

OBJECT AND SUMMARY OF THE INVENTION

The present invention solves the problems described above; it has as an object thereof to provide a semiconductor arithmetic circuit which makes possible edge accentuation processing, edge detection processing, and noise removal by means of averaging processing of an image, using extremely simple circuitry.

In the present invention, in a semiconductor arithmetic circuit which is provided with an amplifier circuit in which an input terminal is connected to the gate electrode of at least one MOS type transistor, a first signal input terminal which is connected via a first switching element with the input terminal, and a plurality of second signal input terminals which are connected to the input terminal via capacity elements; a mechanism is provided for opening the first switching element in a state in which a first signal voltage is applied to the input terminal and a predetermined second input signal voltage group is applied to the second input terminals, and subsequently, for applying a predetermined third input signal voltage group to the second signal input terminals, and the amplifier circuit is a voltage follower circuit constructed using a source follower circuit constructed using MOS type transistors, or a arithmetic circuit employing MOS type transistors in the input stage.

It is characteristic that the third signal voltage group all have a single value and this value is equivalent to the first signal voltage. Furthermore, it is characteristic that the first signal voltage and the second signal voltage group are signals obtained from a group of photo sensors arranged two-dimensionally, or signals obtained in this manner which have been subjected to predetermined arithmetic processing.

Furthermore, it is characteristic that the first signal voltage is a signal obtained from a photo sensor at a predetermined position, or such a signal which has been subjected to predetermined arithmetic processing, and that the second signal voltage group comprises signals obtained from a group of photo sensors adjoining this photo sensor at a predetermined position, or signals obtained in this manner which are subjected to predetermined arithmetic processing.

The output terminal of the amplifier circuit is connected to at least one of the second input terminals via a second switching element.

Furthermore, the semiconductor arithmetic circuit of the present invention is provided with an analog data storage circuit and a mechanism for switching the connections, and the output value of the amplifier circuit is stored in at least a portion of the analog data storage circuit, and the output value stored in this manner is again transmitted to the input terminal using the mechanism for switching the connections.

The semiconductor arithmetic circuit described above constitutes one block, and these blocks are arranged in two dimensions, and furthermore, at least one photo sensor is provided within such a block.

By means of the present invention, it is possible to realize edge accentuation processing, edge detection processing and noise removal as a result of averaging processing of the image, using extremely simple circuitry, and it is possible to achieve high functionality while simultaneously improving the image quality of the two-dimensional image sensor. By means of this, it is possible to conduct image processing in real time.

Effects of the Invention

By means of employing the semiconductor arithmetic circuit of the present invention, it is possible to execute image processing, which previously required an enormous amount of time, in a short period of time, and moreover, using simple hardware. Accordingly, the applications thereof are extremely broad, from multimedia applications to robots having a wide varieties of functions.

BRIEF DESCRIPTION OF THE DIAGRAMS

(Description of the References)

| | |
|---|---|
| 101 | N channel MOS transistor, |
| 102 | P channel MOS transistor, |
| 103 | source follower circuit, |
| 104 | MOS transistor, |
| 101, 102 | common gate electrodes, |
| 105 | switching elements, |
| 106a–106c | input gate electrodes, |
| 107 | output, |
| 601 | voltage follower circuit, |
| 602 | output terminal, |
| 603 | input terminal, |
| 701 | circuit in which the voltage of the output terminal is made equal to that of the input terminal, |
| 702 | output terminal, |
| 703 | input terminal, |
| 704a–704c | signal input terminals, |
| 804, 805 | blocks which have the function of switching the connections in the signal input terminals of the circuit and the picture element value data in accordance with the purpose, |
| 806 | memory circuit which stores analog data, |
| 807 | output line, |
| 808 | wiring. |

BEST MODE FOR CARRYING OUT THE INVENTION

Hereinbelow, the present invention will be explained in greater detail using embodiments.

Embodiment 1

Figure 1:
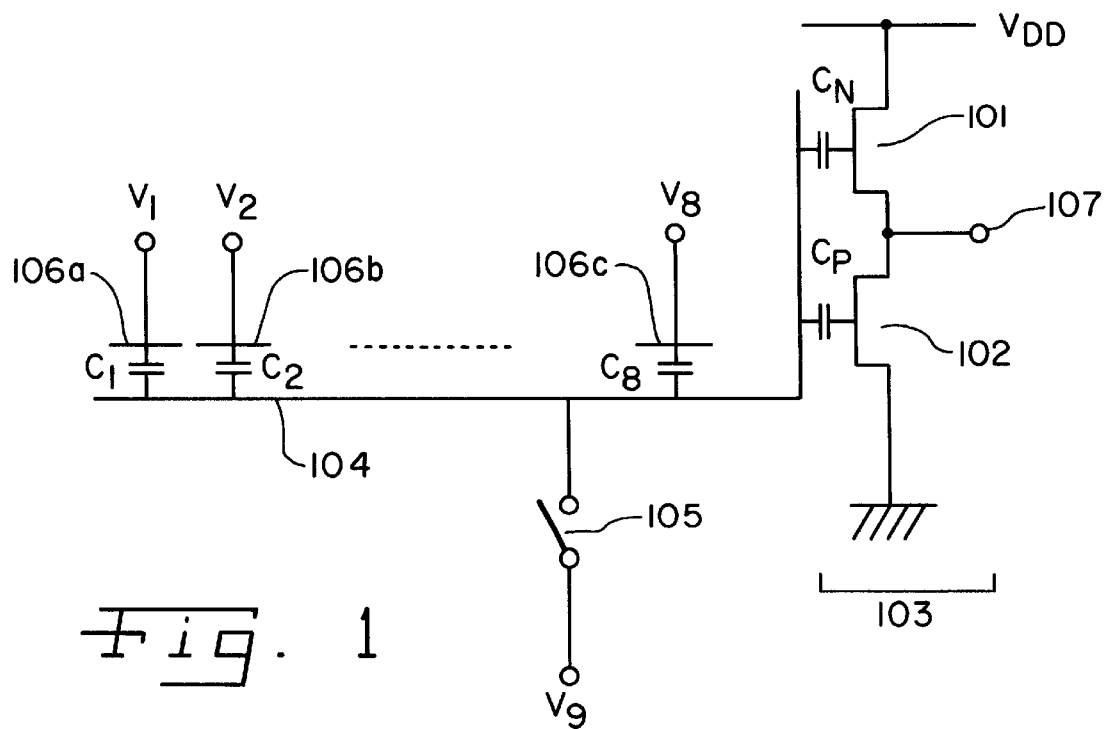
FIG. 1 is a schematic diagram showing a first embodiment of the present invention.

FIG. 1 is a circuit diagram showing a first embodiment of the present invention. Reference 101 indicates a N channel MOS transistor, while reference 102 indicates a P channel MOS transistor; both of these are depression type transistors. Transistors 101 and 102 form a push pull type amplifier, that is to say, a CMOS type source follower circuit 103. Reference 104 indicates a gate electrode common to MOS transistors and 102; this may comprise, for example, a first layer multi-crystalline silicon layer. This serves as the input electrode for source follower circuit 103, and is connected to signal input terminal $V_9$, via switching element 105. This switching element may employ a single NMOS or PMOS, for example, or may comprise a pair of NMOS and PMOS arranged in parallel, or a so-called CMOS switch. $C_N$ and $C_P$, indicate capacities, between the channels and gate electrode 104, of NMOS 101 and PMOS 102, respectively. References 106a–106c and the like indicate input gate electrodes; these may comprise, for example, second layer multi-crystalline silicon layers. Furthermore, these input gates are connected to input signal terminals $V_1$–$V_8$. If the floating potential of the common gate electrode 104 in the state in which switch 105 is open is represented by $V_F$, then $V_F$ is given by the following formula.

$$V_F=(C_1V_1+C_2V_2+ \ldots +C_8V_8+Q_F)/C_{TOT} \quad \text{(Formula 1)}$$

$$C_{TOT}=C_1+C_2+ \ldots +C_8 \quad \text{(Formula 2)}$$

Here, $Q_F$ indicates the amount of charge in the common gate electrode when in a floating state. Furthermore, $C_{TOT}$ indicates the sum of all the capacities connected to the electrode 104, as shown by formula 2. The reason that $C_N$ and $C_P$ are not included therein is that in a source follower circuit, these are effectively extremely small, and can be ignored. The reason for this is that the channels of MOS transistors 102, 102 are electrically at the same potential as output terminal 107, and the value thereof becomes equal to the value of the common gate electrode 104 as a result of the operation of the and $C_P$ does not occur. That is to say, it is possible to ignore $C_N$ and $C_P$.

Figure 2:
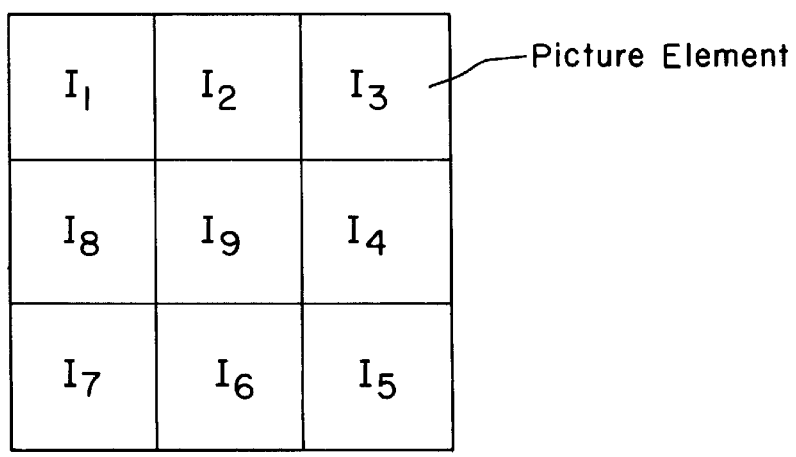
FIG. 2 is a schematic diagram showing the array corresponding to nine picture elements selected from a two-dimensional photo sensor array, and the positional relationships thereof.

FIG. 2 shows the positional relationships of an array corresponding to 9 picture elements which is extracted from a two-dimensional photo sensor array. References $I_1, I_2, \ldots, I_9$ indicate voltage signals expressing the brightness of picture elements 1–9. Picture element 9 is the subject here; picture elements 1–8 are the eight picture elements in the vicinity thereof. An explanation will be given of the operation by which edge accentuation processing is conducted in picture element 9, using FIGS. 3–5.

Figure 3:
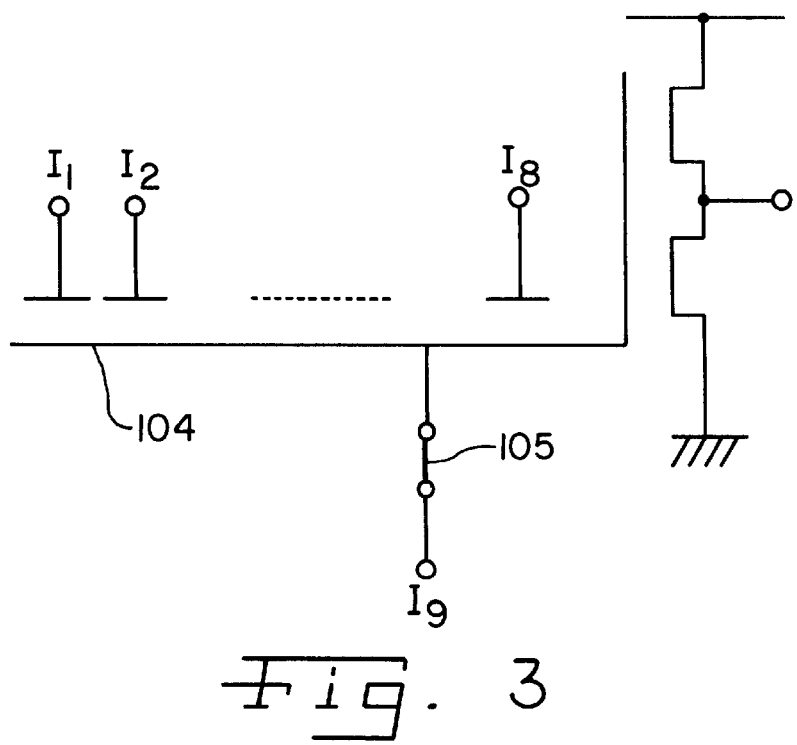
FIG. 3 is a schematic diagram explaining the edge accentuation processing.
Figure 4:
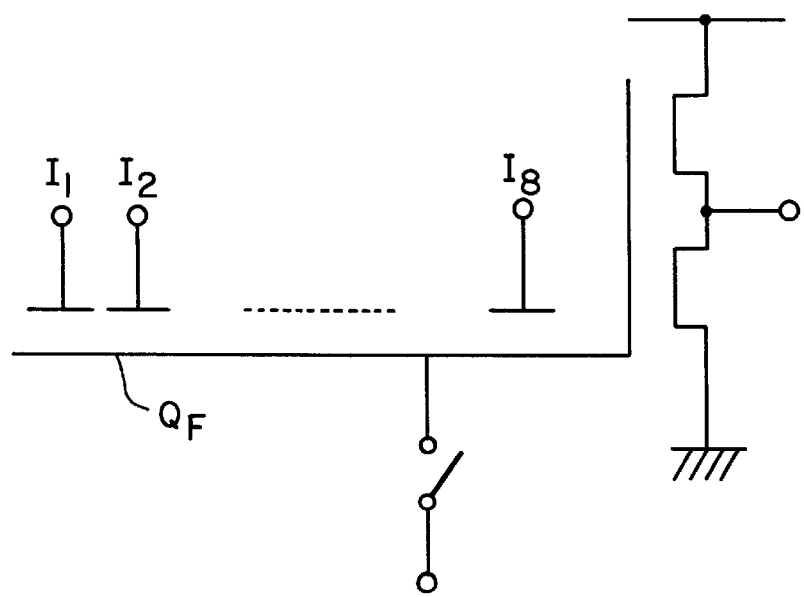
FIG. 4 is a schematic diagram explaining the edge accentuation processing.

First, the first step of the operation is shown in FIG. 3. Switch 105 is closed, and the signal values of each picture element are applied as shown in the figure. That is to say, the center picture element value is inputted into input terminal 104 of the source follower, while the peripheral picture element values are inputted into input signal terminals $V_1$–$V_8$. After this, switch 105 is opened (FIG. 4). At this time, the value of the charge $Q_F$ in the floating electrode 104 can be determined as shown in the following formula 3, using formula 1.

$$Q_F=I_9-(I_1+I_2+ \ldots +I_8)/8 \quad \text{(Formula 3)}$$

Here, $C_1$–$C_8$ all have the same value.

Figure 5:
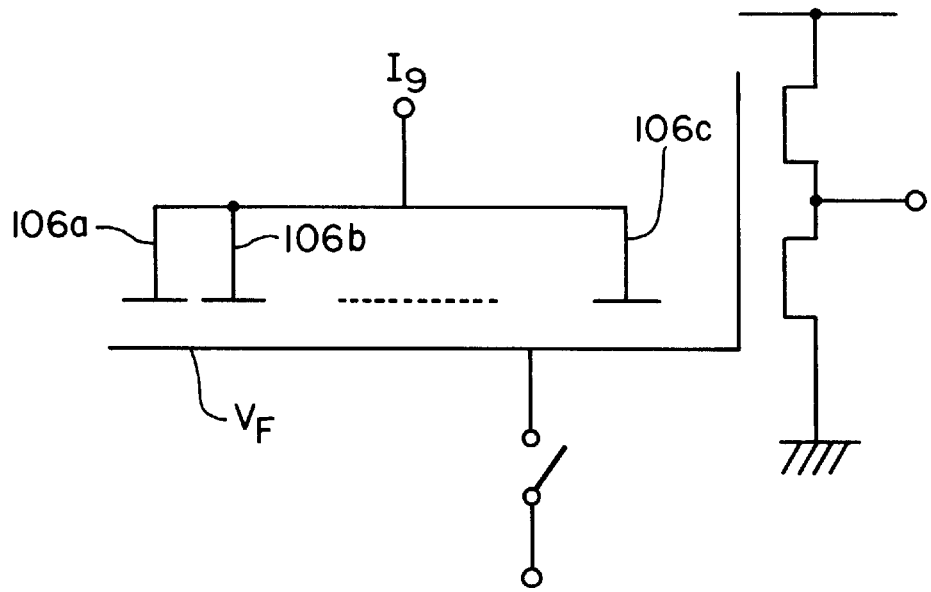
FIG. 5 is a schematic diagram explaining the edge accentuation processing.

Next, as shown in FIG. 5, the same value $I_9$ is inputted into electrodes 106a–106c. Using formulas 1 and 3, $V_F$ at this time can be calculated in the following manner:

$$V_F = I_9 + \{I_9 - (I_1 + I_2 + \ldots + I_8)/8\} \quad \text{(Formula 4)}$$

$$= 2I_9 - (I_1 + I_2 + \ldots + I_8)/8$$

Formula 4 shows the operation used for the edge accentuation processing which is often employed in image processing and the like. That is to say, a determination is first made as to the extent of the shift in the value of picture element 9 from the average value of the eight picture elements surrounding it, and the value of this shift is added to the original picture element value. By proceeding in this manner, when the value of picture element 9 is larger than that of the surrounding picture elements, a gradual increase occurs, while when the value is smaller, a gradual decrease occurs, and the edges are accentuated. In accordance with the present invention, it is possible to conduct highly advanced operations such as edge processing using extremely simple circuitry. That is to say, such operations can be conducted using one source follower circuit, so that it is possible to realize high density sensor arrays even if the photo sensors are integrated in a unitary manner, and high functionality is possible simultaneously with a high image sensor resolution.

Embodiment 2

Figure 6:
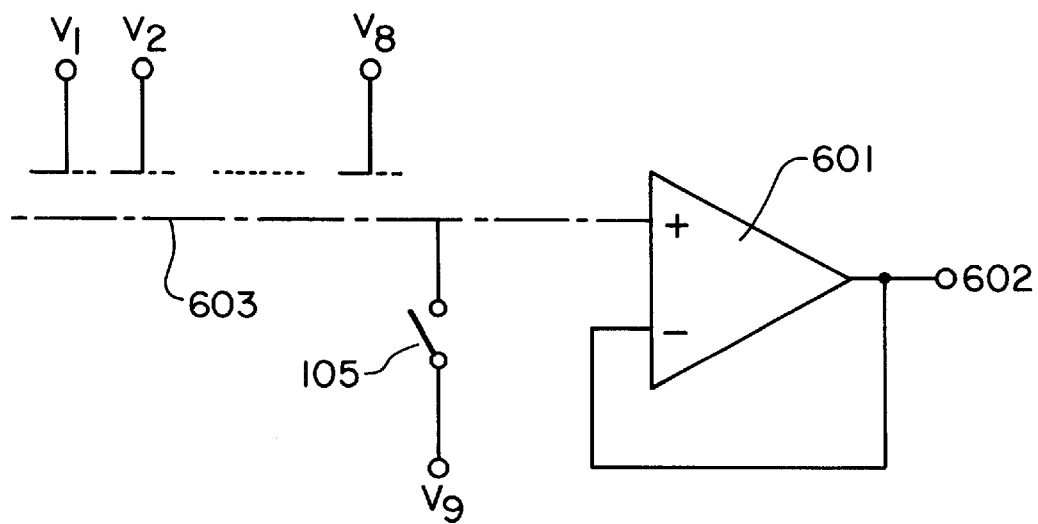
FIG. 6 is a schematic diagram showing a second embodiment of the present invention.

FIG. 6 shows a second embodiment of the present invention. The difference between this embodiment and the first embodiment of FIG. 1 is that, in place of the source follower circuit 103, an arithmetic amplifier of a voltage follower circuit is employed. In the same manner as with the source follower, the voltage appearing in the output terminal 602 is set equal to the potential of the input terminal 603. Since input terminal 603 must be placed in an electrically floating state, it is important that MOS type elements be employed as the devices in the input stage of the arithmetic amplifier; however, with respect to the circuit structure and the like, any such structure is possible.

Embodiment 3

Figure 7:
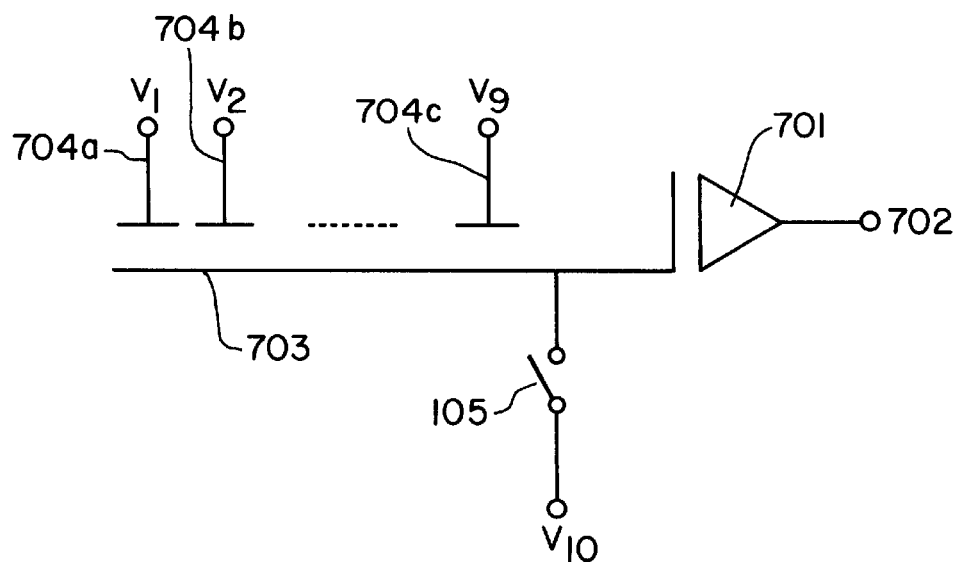
FIG. 7 is a schematic diagram showing a third embodiment of the present invention.

FIG. 7 shows a third embodiment of the present invention. Reference 701 indicates a circuit in which the voltage of the output terminal 702 becomes equal to that of the input terminal 703; a source follower may be employed as in FIG. 1, or an arithmetic amplifier may be employed as in FIG. 6. The present embodiment involves a circuit which conducts noise removal by averaging, and the major difference between this embodiment and the embodiment shown in FIG. 1 is that there are nine signal input terminals 704a–704c, so that this is increased by 1, and the operation thereof is different. The operation will be explained hereinbelow.

First, in the first step, $V_1$–$V_{10}$ are all grounded (0V), and switching element 105 is closed. In the second step, after switch 105 is opened, the picture element values $I_1$–$I_9$ of FIG. 2 are inputted into, respectively, terminals $V_1$–$V_9$. When this is accomplished in accordance with Formula 1, the potential of floating gate 703 becomes the average value of the picture element values $I_1$–$I_9$. That is to say, an output value in which noise is suppressed by averaging processing appears in the output terminal. It is also possible to employ circuitry identical to that of Formula 1 to noise removal in this way.

Embodiment 4

Figure 8:
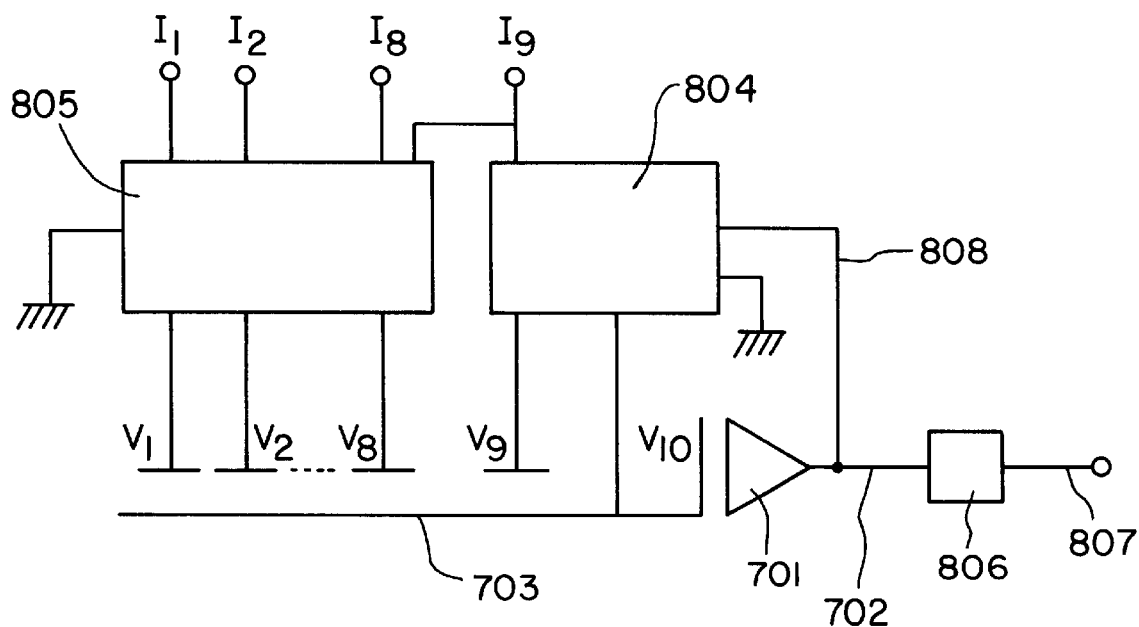
FIG. 8 is a schematic diagram showing a fourth embodiment of the present invention.

FIG. 8 shows a fourth embodiment of the present invention; this circuit is capable of carrying out both noise reduction processing and edge accentuation processing using the circuitry of the third embodiment (FIG. 7). References 701–703 are identical to those in FIG. 7, and $V_1$–$V_{10}$ correspond to the respective signal input terminals in FIG. 7. Switching element 105 is not depicted in FIG. 8 and the function thereof is contained in switch matrix 804. $I_1$–$I_9$ indicate the picture element values, and these are obtained from the photo sensors of the neighboring picture elements and the photo sensor of the picture element itself, directly via wiring as output voltages. Alternatively, these may be the output voltages of memory circuits which temporarily store analog values. References 804 and 805 indicate blocks which have the function of switching the connections of the signal input terminals of the circuit and the picture element value data in accordance with the object. Hereinbelow, the operation of this circuit will be explained.

During the noise removal operation, the signal input terminals $V_1$–$V_8$ are all first connected to the ground in block 805, and in block 804, terminals $V_9$ and $V_{10}$ are connected to the ground. Next, terminal $V_{10}$ is placed in an open state, and then the signal lines of picture element values $I_1$–$I_9$ are connected to terminals $V_1$–$V_9$, respectively. As a result of this operation, the average value of $I_1$–$I_9$ is outputted to output terminal 702. This value is temporarily stored in the memory circuit 806 which stores analog values, and is supplied to the arithmetic circuits of the neighboring picture elements by output line 807. In this way, edge accentuation processing is conducted with respect to data which have been subjected to averaging processing. This is conducted as described below.

First, in block 805, signal lines $I_1$–$I_8$ are connected to $V_1$–$V_8$. Simultaneously, in block 804, signal line $I_9$ is connected to $V_{10}$, and the input voltage of amplifier 701 is fixed at $I_9$. The operations up to this point are identical to those of the first embodiment. What is different is the handling of the remaining $V_9$ signal input terminal; this is connected to the output terminal 702 of amplifier 701 by a connection with wiring 808. Amplifier 701 has the function of a voltage follower, so that the potential of the $V_9$ terminal becomes equal to the potential of electrode 703. That is to say, the capacity between the $V_9$ terminal and electrode 703 does not generate charge or discharge, so that the amount of this capacity is effectively 0. That is to say, in the edge detection processing, it is the same as if the unnecessary $V_9$ input terminal had been removed. Since the unnecessary capacity coupling is eliminated, the operational accuracy of the circuit is increased. Next, after the $V_{10}$ terminal has been opened, the $V_1$–$V_8$ terminals are all connected to $I_9$. By means of this, data which have been subjected to edge accentuation processing are outputted to output terminal 702, and this is identical to the first embodiment shown in FIG. 1. This value may be stored in, for example, memory circuit 806. Alternatively, a memory element other than circuit 806 may be provided, and storage may be conducted therein.

As described above, the circuitry of FIG. 8 has an extremely simple structure comprising a single source follower circuit 701 and a switching block which switches the wiring. By means of this, the fundamental operations of image processing, such as noise removal and edge accentuation, may be executed. Accordingly, the circuitry of FIG. 8 may be unified with a photo sensor as a single picture element and these may be placed in a two-dimensional image sensor, and thereby it is possible to carry out an image processing system having a high resolution and a high degree of functionality.

Furthermore, it is not absolutely necessary to unify the circuitry of the present invention with a photo sensor. The image sensor is a conventional sensor in which the fill ratio (the proportion of the surface area of the device per picture element which is occupied by the light collector part of the photo sensor) is sufficiently large; sensors such as CCD, bi-polar sensors, CMOS sensors, and the like, which have absolutely no arithmetical functions, may be employed. Additionally, the circuit of the present invention may constitute, for example, a processor in which circuits such as those shown in FIG. 8 are arranged in an array at a high density, and may download necessary data relating to the picture element groups from the image sensors and conduct image processing operations. In this case, it is not necessary that the number of picture elements of the image sensor and the number of processor elements of the processor array be the same; there may be fewer of the latter. In this case, the data referring to entire screen captured by the image sensor may be divided into a number of blocks and downloaded to the processor array. Alternatively, data representing the averaged data of a number of adjacent picture elements may be supplied to a single processor element. This is an extremely effective method for extracting the important characteristics of an image. Furthermore, in order to achieve this object, the provision of the necessary number of analog memory circuits in each processor element is effective. Furthermore, processing may be conducted in which the difference absolute value in the picture element values between neighboring picture elements is obtained in each direction, and the maximum value thereof is made the spatial differential value of the image at that position, and by carrying out a further threshold processing, this is placed in binary format, and the edge position is determined. In this binary process, an inverter employing, for example, neuron MOS transistors, may be used in a computer, and the binary threshold value may be made variable where necessary. By means of this, extremely advanced image processing, in which the edge of an image is detected while making determinations with respect to the conditions, becomes possible.

What is claimed is:

1. A semiconductor arithmetic circuit comprising:
   an amplifier circuit in which an input terminal is connected to a gate electrode of t least one MOS type transistor;
   a first signal input terminal which is connected with said input terminals via a first switching element;
   a plurality of second signal input terminals, each said second signal input terminal being connected with said input terminal via a corresponding capacity element; and
   a means for opening said first switching element in a state in which a first signal voltage is applied to said unput terminal and a predetermined second input signal voltage group is applied to said second signal input terminals, and for thereafter applying a predetermined third input signal voltage group to said second signal input terminals, and wherein said amplifier circuit comprises a source follower circuit constructed using MOS type transistors.

2. A semiconductor arithmetic circuit in accordance with one of claim 1 wherein said third input signal voltage group has voltages which are all identical and equivalent to said first signal voltage.

3. A semiconductor arithmetic circuit in accordance with one of claim 2 wherein said first signal voltage and said signal voltage group comprise signals obtained from a photo sensor group arranged in two dimensions.

4. A semiconductor arithmetic circuit in accordance with claim 2 wherein said first signal voltage comprises a signal obtained from a photo sensor at a predetermined position, and said second signal voltage group comprises signals obtained from a photo sensor group adjacent to said photo sensor at a predetermined position.

5. A semiconductor arithmetic circuit in accordance with claim 2 wherein an output terminal of said amplifier circuit is connected with at least one of said second input terminals via a second switching element.

6. A semiconductor arithmetic circuit in accordance with claim 2 wherein an analog data storage circuit and a means for switching connections are provided, and output value of said amplifier circuit is stored in at least a portion of said analog data storage circuit, and this stored output value is again conveyed to said input terminal using said means for switching the connections.

7. A semiconductor arithmetic circuit in accordance with one of claim 1 wherein said first signal voltage and said signal voltage group comprise signals obtained from a photo sensor group arranged in two dimensions.

8. A semiconductor arithmetic circuit in accordance with claim 7 wherein said first signal voltage comprises a signal obtained from a photo sensor at a predetermined position, and said second signal voltage group comprises signals obtained from a photo sensor group adjacent to said photo sensor at a predetermined position.

9. A semiconductor arithmetic circuit in accordance with claim 7 wherein an output terminal of said amplifier circuit is connected with at least one of said second input terminals via a second switching element.

10. A semiconductor arithmetic circuit in accordance with claim 1 wherein said first signal voltage comprises a signal obtained from a photo sensor at a predetermined position; and said second signal voltage group comprises signals obtained from a photo sensor group adjacent to said photo sensor at a predetermined position.

11. A semiconductor arithmetic circuit in accordance with claim 1 wherein an output terminal of said amplifier circuit is connected with at least one of said second input terminals via a second switching element.

12. A semiconductor arithmetic circuit in accordance with claim 1 wherein an analog data storage circuit and a means for switching connections are provided, and output value of said amplifier circuit is stored in at least a portion of said analog data storage circuit, and this stored output value is again conveyed to said input terminal using said means for switching the connections.

13. A semiconductor arithmetic circuit of claim 12 wherein the semiconductor arithmetic circuit is used as one block, and said blocks are arranged in two dimensions.

14. A semiconductor arithmetic circuit in accordance with claim 13, wherein at least one photo sensor is provided within said block.

15. A semiconductor arithmetic circuit comprising:
   an amplifier circuit in which an input terminal is connected to a gate electrode of at least one MOS type transistor having an input stage;
   a first signal input terminal is connected with said input terminal via a first switching element;
   a plurality of second signal input terminals, each said second signal input terminal being connected with said input terminal via a corresponding capacity element; and
   a means for opening said first switching element in a state in which a first signal voltage is applied to said input terminal and a predetermined second input signal voltage group is applied to said second signal input terminals, and for thereafter applying a predetermined third input signal voltage group to said second signal input terminals, and wherein said amplifier circuit comprises a voltage follower circuit constructed using an arithmetic amplifier having MOS type transistors in the input stage thereof.

16. A semiconductor arithmetic circuit in accordance with one of claim 15 wherein said third input signal voltage group has voltages which are all identical and equivalent to said first signal voltage.

17. A semiconductor arithmetic circuit in accordance with one of claim 15 wherein said first signal voltage and said signal voltage group comprise signals obtained from a photo sensor group arranged in two dimensions.

18. A semiconductor arithmetic circuit in accordance with claim 15 wherein said first signal voltage comprises a signal obtained from a photo sensor at a predetermined position, and said second signal voltage group comprises signals obtained from a photo sensor group adjacent to said photo sensor at a predetermined position.

19. A semiconductor arithmetic circuit in accordance with claim 15 wherein an output terminal of said amplifier circuit is connected with at least one of said second input terminals via a second switching element.

20. A semiconductor arithmetic circuit in accordance with claim 15 wherein an analog data storage circuit and a means for switching connections are provided, and output value of said amplifier circuit is stored in at least a portion of said analog data storage circuit, and this stored output value is again conveyed to said input terminal using said means for switching the connections.

* * * * *